Sept. 9, 1958  W. H. JOBE  2,850,926
VISE
Filed Nov. 9, 1953  2 Sheets-Sheet 1
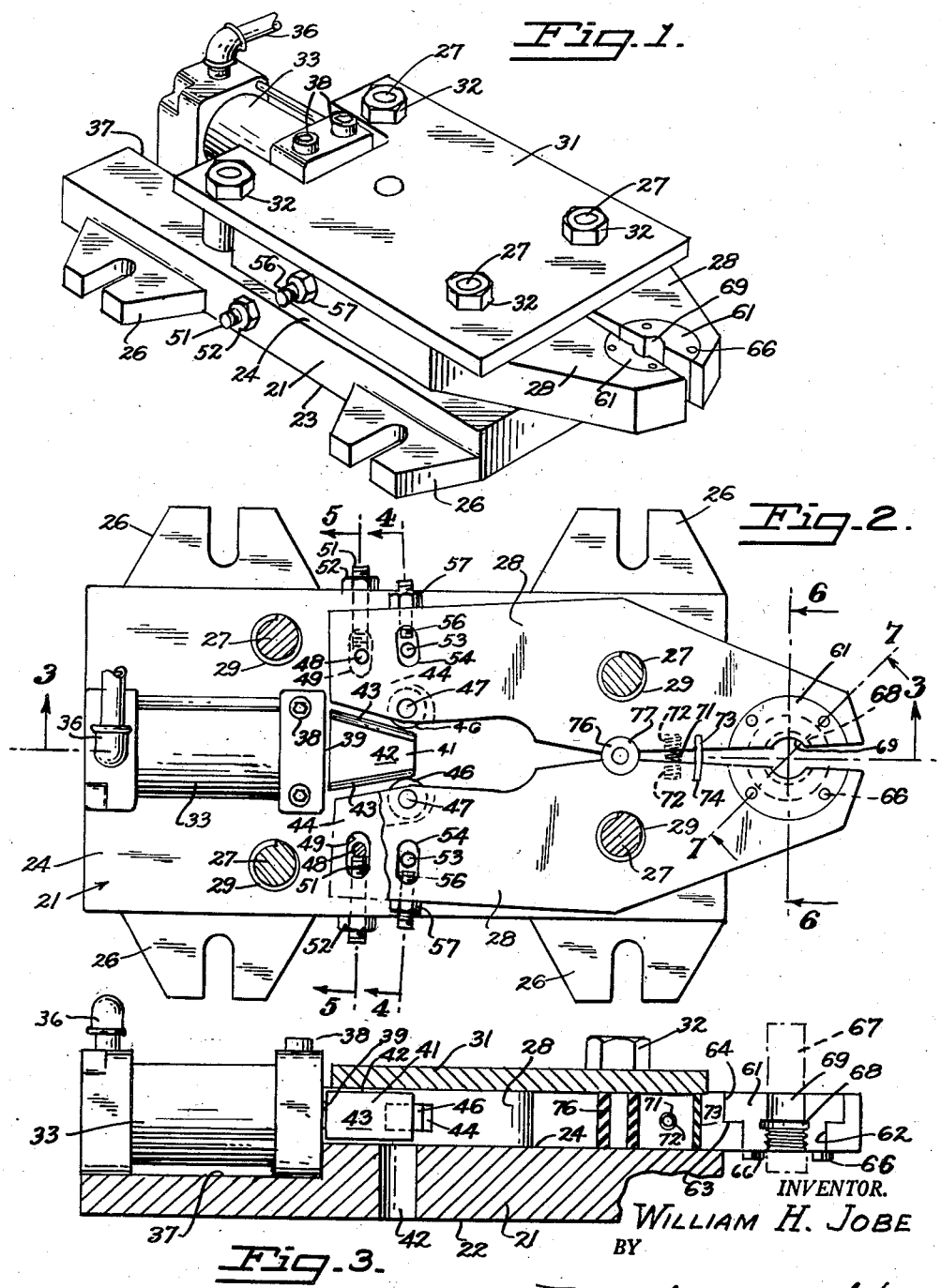
INVENTOR.
WILLIAM H. JOBE
BY
Townsend, Townsend and Hoppe
ATTORNEYS Sept. 9, 1958   W. H. JOBE   2,850,926
VISE Filed Nov. 9, 1953   2 Sheets-Sheet 2

INVENTOR.
WILLIAM H. JOBE
BY
Townsend, Townsend and Hoppe
ATTORNEYS

United States Patent Office 2,850,926
Patented Sept. 9, 1958

2,850,926

VISE

William H. Jobe, South San Francisco, Calif., assignor to Tronic Tooling Corp., South San Francisco, Calif., a corporation of California Application November 9, 1953, Serial No. 390,792

4 Claims. (Cl. 77—63)

This invention relates to a new and improved vise. More particularly, the invention relates to a vise to hold work-pieces during machining operations. The vise is characterized by the fact that pivoted vise jaws are employed which jaws are forced together by wedging action, the wedge being actuated by a pneumatic or hydraulic piston.

One of the features of the present invention is the speed of production which is achieved by use of the vise inasmuch as the number of manual operations and the duration of time of the manual operations is considerably reduced over conventional vises, since the operator does not have to turn a vise screw either in clamping or unclamping the work-piece.

Another feature of the invention is the simplification of the insertion and removal of work-pieces from the vise which enables the equipment to be used by relatively unskilled labor. A further feature of this simplification is the fact that the safety of the use of the vise is greatly improved.

Another advantage of the vise is the fact that it is inter-changeable for a wide variety of work-pieces. Jaw inserts are provided which may be designed to fit specific work-pieces and which may be replaced when the job being performed requires different shapes of inserts. The inserts clamp the work-piece during the machining operation.

Still another feature of the invention is the fact that it may be used in a wide variety of machining operations, such as drilling, tapping and the like.

One of the most important features of the invention is the fact that the weight of the vise is very materially reduced over prior vises of this general nature. This is of extreme importance particularly when the vise is to be mounted on a revolving turret inasmuch as the indexing of the turret is greatly facilitated by reduction of the weight of the vise mounted thereon.

Still another important feature of the invention is the fact that the space occupied by the vise is very materially reduced over conventional vises of this type. In consideration of the reduction of space, it should be pointed out that the thickness or height of the vise is reduced to a minimum which is advantageous in arranging for the insertion and ejection of work-pieces and enhances the versatility of use of the vise.

Another feature of the invention is the fact that the limits of inward and outward movement of the vise jaws may be adjustably controlled. Thus, adjustment of the inward movement prevents crushing of the piece, as when a tubular stock is employed. Control of the outward movement of the jaws enables these jaws to operate efficiently under a number of conditions, as will hereinafter be explained.

Another feature of the invention is the fact that it clamps a work-piece in such a manner that the work-piece can be machined simultaneously at either end in one operation.

Other objects of the present invention will become apparent upon reading the following specification and referring to the accompanying drawings in which similar characters of reference represent corresponding parts in each of the several views.

In the drawings:

Fig. 1 is a perspective of the vise.

Fig. 2 is a top plan partially broken away in section.

Fig. 3 is a longitudinal vertical section taken substantially along the line 3—3 of Fig. 2.

Figure 4:
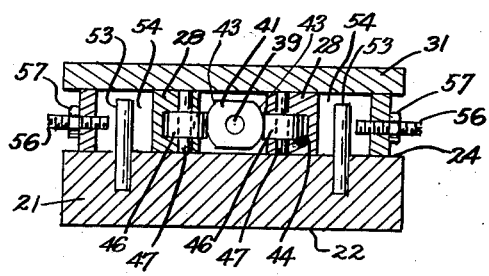
Fig. 4 is a transverse vertical section taken substantially along the line 4—4 of Fig. 2.
Figure 5:
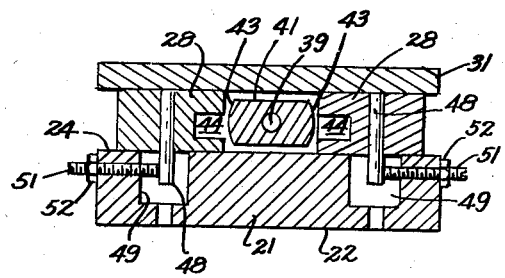
Fig. 5 is a transverse vertical section taken substantially along the line 5—5 of Fig. 2.
Figure 6:
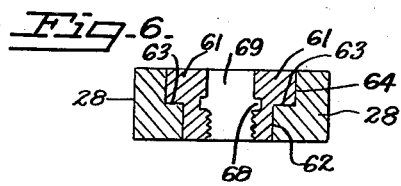
Fig. 6 is a vertical section through the jaws and jaw inserts taken substantially along the line 6—6 of Fig. 2.
Figure 7:
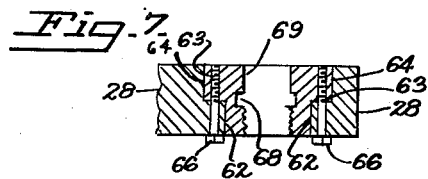
Fig. 7 is a vertical section through the jaws and jaw inserts taken substantially along the line 7—7 of Fig. 2.

The present invention comprises a vise for holding work-pieces during machining operations, which vise may be attached to the work table of a bench or machine. Accordingly, there is provided an underlying bottom plate 21 having a smooth, flat bottom surface 22 adapted to rest upon the bench or machine table 23. The top surface 24 of the bottom plate is likewise finished smooth. Projecting outwardly from the sides of the bottom plate are slotted ears 26 by means of which the bottom plate may be clamped or bolted in proper position on the surface to which it is to be attached. Projecting outwardly above the top surface of the bottom plate are four machine screws 27, two on each side of the bottom plate, spaced front and rear. The two forward screws comprise pivots for the vise jaws 28.

The vise jaws 28 comprise elongated flat members extending from adjacent the rear of the bottom plate 21 and projecting outwardly beyond the front edge of the bottom plate. The jaws are apertured for the reception of bushings 29 located surrounding the front machine screws 27. Thus, when the rear ends of the jaws 28 are moved outwardly, the jaws pivot around the centers of front screws 27 and the front ends of the jaws move inwardly. As hereinafter explained the inward movement of the front end of the jaws clamps the work-piece in position for machining operations.

The jaws 28 rest upon the top locating surface 24 of the bottom plate. A cover plate 31 is provided on top of the jaws, this plate being apertured to receive the four machine screws 27. Bushings 29 are of proper height so that the cover plate rests on the upper ends of the bushings and does not bind the jaws to prevent pivotal movement thereof. Nuts 32 on the machine screws 27 hold the cover plate 31 in position.

Actuation of the jaws is accomplished by a hydraulic or pneumatic cylinder 33. Preferably the cylinder is solenoid-controlled, as hereinafter described, by means of a valve 34 in the hydraulic or pneumatic line 36 connected to the cylinder 33. The cylinder is mounted on the rear of the bottom plate 21 on the center line of the vise. There are various types of actuating cylinders 33 commercially available, the details of the construction of which form no part of this invention. As illustrated herein a pneumatic cylinder is provided, the cylinder being received in a groove 37 in the rear of bottom plate 21 which locates the cylinder in position. Screws 38 hold the cylinder in place in the groove 37. A piston rod 39 projects out from the front end of the cylinder, it being understood that the piston rod is connected to a piston (not shown) within the cylinder. On the end of the piston rod 39 is a tapered actuating wedge 41 having flat top and bottom surfaces 42 and accurately machined tapered sides 43 which function to move the jaws as hereinafter described.

Slots 44 are formed on the inner rearward side edges of the vise jaws 28 and within each slot is a hardened roller 46 mounted on a vertical pin 47. When the tapered wedge 41 is projected forwardly by actuation of the cylinder 33, the tapered side of edges 43 of the wedge 41 engage the rollers 46. As the wedge 41 moves forwardly, the rearward ends of the jaws 28 are forced apart, which in turn forces the forward ends of the jaws together for clamping action.

Limitation of movement of the jaws 28 is accomplished by means which control the inner and outer movement of the jaws. The inward movement is controlled by a pin 48 on the rearward end of each jaw, which pin projects down into a slot in the top surface of bottom plate 21. An adjusting screw 51 is threaded through the side of bottom plate 21 and into slot 49. The outward movement of pin 48 is limited upon contact with the inner end of adjustment screw 51 and hence the inward movement of the forward end of the jaws is thus controlled. Lock nut 52 holds the adjustment screw 51 in position after once being adjusted.

The outward movement of the jaws is likewise controlled by pins 53 which project up from the bottom plate 21 and into a slot 54 in the rearward end of jaws. Adjustment screws 56 are threaded through the sides of jaws and into slots 54. The pins 52 limit the inward movement of the rear ends of the jaws 28 to contact with the inner ends of adjustment screws 56 and this in turn limits the outward movement of the front ends of jaws. Lock nuts 57 on screws 56 fix the position of the adjustment screws 56 after once being adjusted.

It will be observed from the foregoing described structure that each jaw 28 is independently adjustable with respect to the distance of its inward and outward pivotal movement. The inward movement of the front ends of the jaws is preferably controlled to prevent unnecessary damage to the work-piece. The outward movement of the front end of the jaws is controlled in a manner such that a work-piece which, as herein illustrated, requires a large opening to accept a large shoulder, may be accommodated. On the other hand, a cylindrically-shaped work-piece which requires a smaller opening may be accommodated effectively in order to insure correct positioning and to avoid clamping the piece out of proper alignment.

At the forward end of the jaws of the vise are provided jaw inserts 61, semicircular in plan, which are received in sockets 62 in the forward ends of the jaws 28. The inserts are formed with horizontal shoulders 63 which rest on the bottom of a counterbore 64 recessed in the top surface of the jaw. The inserts 61 are held in place by screws 66 projecting up through the bottom of the jaws and received in the shoulders 63 of the inserts. The shape of the jaw inserts 61 depends upon the shape of the work-piece to be clamped. Thus it will be understood that the inserts are made inter-changeable for the job being handled. As shown in the accompanying drawings, a work-piece 67 which is threaded is to be clamped. Hence, a locating shoulder 68 is formed in the semi-circular recess in the jaw insert 61 which shoulder limits the upward movement of a work-piece inserted from underneath the jaws. Below the shoulder 68 the jaw inserts are threaded to clamp the threaded surface of the work-piece. The hole 69 above the shoulder provides entry for tool 94 which engages the work-piece. As has been stated, the foregoing description of the jaw inserts is specific to a particular type of work-piece herein illustrated, it being understood that the shape of the inserts is subject to wide variation.

To assist in forcing the jaws apart when cylinder 33 is not actuated, a horizontally located helical spring 71 is positioned in horizontally opposed holes 72 in the inner edges of the jaws 28, which spring biases the jaws apart and assists in releasing the work-piece when the actuator wedge 41 retracts. To prevent interference with the action of the spring a fiber insert 73 is located within vertical slots 74 in the inner edges of the jaws ahead of spring 71, which tends to prevent chips from moving rearwardly. Likewise to prevent chips from interfering with the action of the vise, a resilient tubular insert 76 is placed in semi-circular grooves 77 in the inner edges of the vise jaws rearwardly of spring 71.

In operation of the vise, after the same has been located in position, suitable jaw inserts 61 are provided for the work-piece 67 to be handled. The operator then places the work-piece 67 manually in position, putting one end or a shoulder of the work-piece in contact with the locating shoulder 68 of the jaw insert. Thereupon, the valve 34 controlling the actuating cylinder is opened by suitable controls whereupon the actuator wedge 41 is forced forwardly and into contact with the rollers 46, thereby spreading the rear ends of the jaws 28 apart and bringing the front ends of the jaws and the jaw inserts 61 together and clamping the work-piece. When the tool completes its work upon the work-piece, the actuating cylinder 33 is discharged by suitable means and the spring 71 then forces the jaws 28 apart, releasing the work-piece. The locating screws 51 and 56 are adjusted to limit the inward and outward movement of the jaws 28 so that the work-piece is not damaged by the jaws but is only sufficiently clamped to hold it in place, and the outward movement of the jaws is controlled so that unnecessary movement is avoided.

Figure 8:
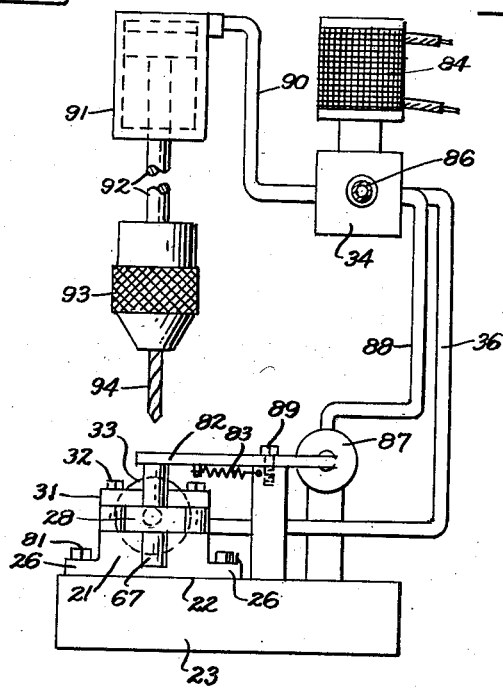
Fig. 8 is a schematic front elevation of the vise located for a machining operation and illustraitng a system whereby the vise may be advantageously employed.
Figure 9:
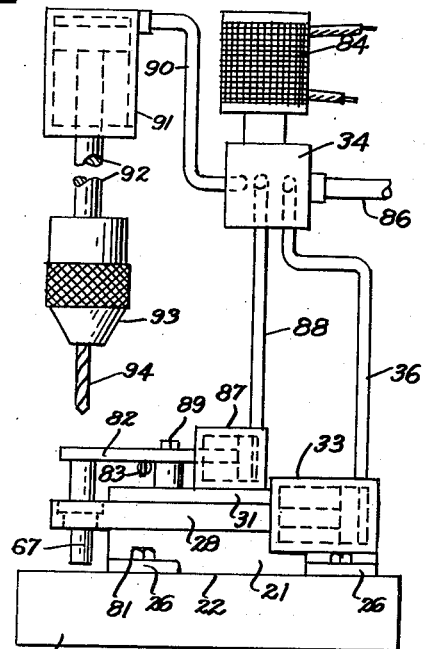
Fig. 9 is a schematic side elevation of the structure of Fig. 8.

As illustrated schematically in Fig. 8 the vise may be used in a pneumatic system to greatly reduce the time of hand operations required to machine small work-pieces 67. Thus, as illustrated herein, a work table 23 is provided on which the vise is bolted by means of bolts 81. A work locating stop 82 is biased by spring 83 to be interposed into the space above the vise at the commencement of operations. The operator places the work-piece 67 between the open jaws 28 of the vise with the upper end of the work-piece in contact with the lower end of the locating stop 82. The operator then actuates a switch which then energizes a conventional solenoid 84 controlling pneumatic valve 34 connected by pipe 86 to a source of compressed air which actuates cylinder 33 through line 36 to close the jaws of the vise, thereby clamping the work-piece between the jaw inserts 61. Immediately after the vise jaws have closed, the valve 34 in sequence energizes a second air cylinder 87 through line 88 which retracts the work-piece locating stop 82, the stop swinging about pivot 89 and against the action of spring 83. As soon as the work-piece stop has cleared, a third cylinder 91 is actuated by way of line 90 to lower the spindle 92 of the tool. As illustrated herein the spindle 92 holds a chuck 93 at its lower end, which chuck holds a drill 94. The spindle 92 is caused to revolve by means not shown and, as it revolves, the drill 94 is lowered into contact with the work-piece 67 and the downward movement of the drill is continued to the proper depth of the hole being drilled in the work-piece. As soon as the drill 94 has reached the lower limit of its designed movement, a limit switch (not shown) is actuated which de-energizes the solenoid 84 and thereupon in sequence the work spindle 92 is raised; the jaws 28 of the vise being released by exhaust of the actuating cylinder 33 and the cylinder 87 likewise exhausted, whereupon spring 83 brings the work-stop 82 into position above the vice and the apparatus is in proper relationship for repitition of the cycle.

Although I have described my invention in some detail by way of illustration and example for purposes of clarity of understanding, it is understood that certain changes and modifications may be practiced within the spirit of the invention and scope of the appended claims.

What is claimed is:

1. A vise comprising a base plate, said base plate having a substantially flat surface adjacent the forward end thereof and being formed with a recess adjacent the rear end thereof, a pair of pivot pins mounted in said base plate and extending perpendicular thereto, a pair of movable jaws each having a pair of flat parallel surfaces, one of the flat parallel surfaces of each said jaw resting upon the forward portion of said base plate, each of said jaws being apertured to receive one of said pivot pins, a cover plate having a flat undersurface parallel to the forward portion of said base plate and engaging one flat surface of each said jaw, means fastening said cover plate to said base plate to maintain said cover plate in spaced parallel relation to said base plate, a cylinder mounted in the recess of said base plate, said cylinder having a piston and a piston rod connected thereto and projecting from said cylinder in a direction toward said jaws, said piston rod being at a level substantially equidistant between the top surface of said base plate and the bottom surface of said cover plate, a wedge mounted on said rod tapering in two opposed directions relative to said jaws with its narrowest portion directed forwardly of said vise, the tapered edges of said wedge extending substantially perpendicular to the top surface of said base plate, the inner edges of said jaws being recessed adjacent said wedge, a roller mounted in the recess in each said jaw, means mounting said rollers in said jaws for rotation about an axis perpendicular to the top surface of said base plate, one said roller being positioned to engage one tapered side of said wedge and the other said roller being positioned to engage the diametrically opposite tapered side of said wedge, said wedge being operable when pressure is applied in said cylinder to force said rollers apart and move both said jaws relative to said base plate to pivot said jaws about said pivot pins and close said jaws.

2. A vise according to claim 1 in which one of the said jaws is provided with a vertical pin and said base plate is provided with a horizontally extending slot into which said pin extends, and an adjustment screw threaded into said base plate and extending horizontally into said slot to limit movement of said jaw in one direction.

3. A vise according to claim 1 in which said base plate is provided with a vertical pin and one of said jaws is provided with a horizontally extending slot into which said pin extends and an adjustment screw threaded into said jaw and extending horizontally into said slot to limit movement of said jaw in one direction.

4. A vise according to claim 1 in which one of said jaws is provided with a first vertical pin and said base plate is provided with a horizontally extending first slot into which said first pin extends and a first adjustment screw threaded into said base plate and extending horizontally into said first slot to limit movement of said jaw in one direction and in which said base plate is provided with a second vertical pin and said jaw is provided with a horizontally extending second slot into which said second pin extends and a second adjustment screw threaded into said jaw and extending horizontally into said second slot to limit movement of said jaw in the opposite direction.

References Cited in the file of this patent

UNITED STATES PATENTS

| | | |
|---|---|---|
| 455,645 | Spriggs | July 7, 1891 |
| 1,060,477 | Meyers | Apr. 29, 1913 |
| 1,972,595 | Libby | Sept. 4, 1934 |
| 2,390,420 | Burke | Dec. 4, 1945 |
| 2,472,968 | Goldberg | June 14, 1949 |